Figure 1:
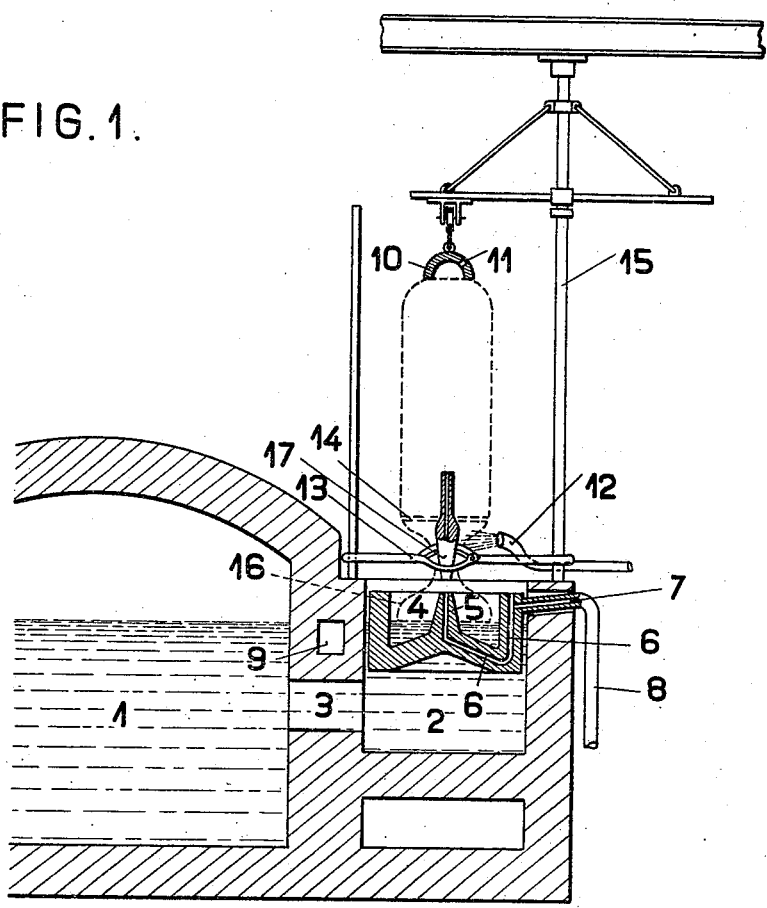

W. ZAHRADNIK.
METHOD OF PERMANENTLY DRAWING SHEET GLASS ROLLERS AND OTHER HOLLOW ARTICLES IMMEDIATELY FROM THE GLASS HARBOR.
APPLICATION FILED DEC. 31, 1912.

1,085,835.   Patented Feb. 3, 1914.

Witnesses.
R. V. Dommers
E. Leckert.

Inventor.
Wenzeslaus Zahradnik
By Henry Orth Jr.
Atty.

UNITED STATES PATENT OFFICE.

WENZESLAUS ZAHRADNIK, OF TSCHERNITZ, GERMANY.

METHOD OF PERMANENTLY DRAWING SHEET-GLASS ROLLERS AND OTHER HOLLOW ARTICLES IMMEDIATELY FROM THE GLASS-HARBOR.

1,085,835.

Specification of Letters Patent.

Patented Feb. 3, 1914.

Application filed December 31, 1912. Serial No. 739,487.

*To all whom it may concern:*

Be it known that I, WENZESLAUS ZAHRADNIK, a subject of the Emperor of Germany, residing at Tschernitz, Niederlausitz, Germany, have invented new and useful Improvements in Methods for Permanently Drawing Sheet-Glass Rollers and other Hollow Articles Immediately from the Glass-Harbor, of which the following is a specification.

This invention refers to a method for permanently drawing sheet-glass cylinders and other hollow articles from a bath of molten glass.

It is old to make hollow glass articles by dipping a bait or drawing tool into the mass of molten glass, lifting the bait or drawing tool, then drawing, in ratio to its size, a portion of the glass adhering thereto from the glass bath, whereby, after solidification, the hollow article is formed. After having removed the glass body so formed from the bait or drawing member, the latter is lowered again into the bath for drawing a new article.

In connection with one of the known methods, compressed air is supplied from the top, either by a pipe connected with the bait, or by means of a nozzle rising from the glass-bath.

With a view to avoiding the repeated dipping of the bait into the molten glass for the subsequent hollow articles that are to be drawn, it has been proposed either to retain, by means of a stationary clamping device close to the rigid outer wall, the straight residual section remaining after having disjoined the cylinder made, and subsequently closing said section air-tight by a movable seizing and blasting device and then lifting it: or, according to another suggestion, after disjunction of the drawn cylinder, the straight residual body was gripped with the assistance of an internal cutting device and clamping contrivance, and simultaneously therewith at the outer side by an outside clamping contrivance, and drawn into a new hollow article. With all these known arrangements the great trouble experienced has been that the operator is seldom successful in severing in a horizontal straight line the completed, but still hot, cylinder, it being, however, an indispensable condition for the drawing out of a new hollow article to close the residual section and to supply and regulate the blast-air. A section disconnected in an uneven intersection-line cannot be used for continued drawing of hollow articles, by reason of insufficient packing.

In contradistinction to the above, in the present method there is formed a hood-like residual section, by providing the cylinder at the end, where it is lifted out, close to the molten glass, with a recess or restricted portion, and by severing the cylinder above the narrowest point of such recess. To provide the cylinder, after the drawing action has been finished, at its bottom end with such a recess, with a view to facilitate its disconnection, is known already; such disconnection did not take place, however, under formation of a residual section having a central recess for facilitating the gripping operation; nor has the residual section been made use of for further drawing.

In the present method of operation the gripping and tightening of the residual section at the mouth-piece below the line of severance is independent of the severance of the drawn cylinder, such severance being either in a straight or in an untrue line, and the blast-air can be introduced into the hollow glass article to be drawn both from the top and from the bottom. Also the severance itself is not accomplished at the narrowest point, as heretofore, but above it, with a view to obtaining a broader rim projecting above the residual section. This broader rim is used to facilitate the holding of the residual section in position in the half-opened tongs. The grooved extremity or restricted portion may either be fully closed, or, by setting in a hollow core, it may be used for leading out the blast air, introduced from below, or for supplying the blast air from the top.

In order to more fully explain the method of operation, reference is had to the accompanying drawings, in which like reference characters indicate like parts in the several views.

Figure 2:
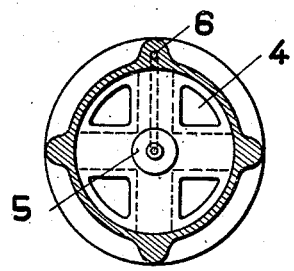

Figure 1 is a vertical section of an apparatus for carrying out my invention, showing parts in section; Fig. 2 is a plan view, partly in section, of the float.

The melting pot 1 has built close up to it a fore-hearth or tank, 2, for receiving the molten glass from the pot 1, which, through an opening 3 flows over from the pot or furnace into the tank 2. In this fore-hearth 2 there is a floating annular member 4 having in its bottom a nozzle 5 connected by passages 6 and 7 with the compressed air piping. The supply through the pipe 8 into the passage 6 can be effected either from the side or from the top. The air supply through the floating annular medium has the advantage that it can follow the variations of the level of the molten glass in the fore-hearth.

In order to provide sufficient room for the alterations of position of the annular member or float, the fore-hearth 2 is deepened. The pipe section 7 can be tightened at the point of discharge into the passage 6 by glass, which at the temperature prevailing there remains viscous. The bottom of the float 4 has several apertures through which the molten glass can pass from the fore-hearth. Through a channel 9 arranged in the partition between the glass pot or furnace 1 and the fore-hearth 2 the wall is intensely cooled, so that the glass in the fore-hearth 2 gets an even temperature throughout, whereby the mass is kept suitably plastic for drawing the cylinders. The clearance between the float 4 and the walls of the fore-hearth is, of course, kept sufficiently large, in order to take into account the movements of the glass flowing in, and those of the float.

Into the glass contained in the fore-hearth 2 of the furnace 1 an iron globe-shaped or bell-shaped bait 10 of the known type is dipped just enough so that when it is lifted, the glass remains sticking to its rim; the bait 10 is then slowly raised by means of a suitable device, under constant supply of air through the nozzle 5. The excess of air escapes through the usual aperture 11 in the bait. After having attained a given length, the drawn cylinder is stripped off in the known manner. This is assisted by the flame of the burner 12.

The drawn cylinder is not severed, as heretofore, at the narrowest part of its lower contracted end at the nozzle 5, but at the normal diameter of the cylinder for forming the rim 14. The cylinder may, however, be severed near the nozzle 5, but above the narrowest point thereof, so that above its most contracted portion there is still a broader rim left for gripping it. By turning aside the crane 15 the cylinder is transported to the place of deposition, for being carried along farther. The farther cylinders are now drawn with the assistance of the residual sections 16. The half-opened lifting tongs 13 are supporting the residual section at the point of contraction to prevent it from sinking into the glass-bath, in such a manner that the residual portion 16 with its adhering rim 14 remains in the lifting tongs. Now the contracted part may be hermetically sealed, either by compression or by the melted glass; or there may be slipped in from the top into the tapering opening a heated hollow core or support 17, made of metal or of other incombustible material, whereupon, under further heating through the flame of the burner 12, the lifting tongs are closed and firmly pressed toward the core to seal the contracted portion against the core. Now the lifting tongs are raised under simultaneous air supply, and a new cylinder is formed.

Obviously, the compressed air instead of being supplied through a float, may be supplied in a known manner from below through a stationary nozzle, or from the top through the core 17 which has been introduced into the contracted neck. When compressed air is supplied from below and a core is introduced from the top, the air escapes through the bore in the core 17.

I claim—

1. The method of drawing glass cylinders and other hollow articles, which comprises contracting, and gripping the drawn cylinder at the contracted portion, severing the cylinder above the contracted portion and drawing a subsequent cylinder by the residue containing said contracted portion.

2. The method of drawing glass cylinders and other hollow articles, which comprises contracting the lower end of the cylinder, supporting said contracted portion above the surface of the glass from which the cylinder is being drawn, severing the cylinder above the contracted portion, supplying air to the interior of said portion and drawing a subsequent cylinder by said portion.

3. The method of drawing glass cylinders and other hollow articles, which comprises contracting the lower end of the cylinder sufficient for engagement of a drawing tool, severing the cylinder above the contracted portion, closing the contracted portion against a support for maintaining an air conduit through the contracted portion, and drawing a subsequent cylinder.

4. The method of drawing glass cylinders and other hollow bodies, which comprises mechanically contracting the lower end of the cylinder while supplying heat to the point to be contracted, severing the cylinder above the point of contraction, further reducing said contracted portion against a heated hollow support and then drawing a subsequent cylinder by the residue below the point of severance.

5. The method of drawing glass cylinders and other hollow bodies, which comprises mechanically contracting the lower end of the cylinder while supplying heat to the point to be contracted, severing the cylinder above the point of contraction, further reducing said contracted portion against a heated hollow support and then drawing a subsequent cylinder by the residue below the point of severance while supplying air to the interior of the cylinder being drawn.

6. The method of drawing glass cylinders and other hollow bodies, which comprises mechanically contracting the lower end of the cylinder while supplying heat to the point to be contracted, severing the cylinder above the point of contraction, further reducing said contracted portion against a heated hollow support and then drawing a subsequent cylinder by the residue below the point of severance while supplying air through said hollow support to the interior of the cylinder being drawn.

In testimony whereof I affix hereunto my signature in the presence of two witnesses.

WENZESLAUS ZAHRADNIK.

Witnesses:
PAUL ARRAS,
ARTHUR GUBE.

Copies of this patent may be obtained for five cents each, by addressing the "Commissioner of Patents, Washington, D. C."